US012619404B2

(12) United States Patent　　　(10) Patent No.:　US 12,619,404 B2
Li　　　(45) Date of Patent:　　　May 5, 2026

(54) DATA PROCESSING METHODS AND APPARATUSES, DEVICES, AND STORAGE MEDIUMS

(71) Applicant: ALIPAY (HANGZHOU) INFORMATION TECHNOLOGY CO., LTD., Hangzhou (CN)

(72) Inventor: Mengyu Li, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 188 days.

(21) Appl. No.: 18/500,682

(22) Filed: Nov. 2, 2023

(65) Prior Publication Data

US 2024/0143298 A1　　May 2, 2024

(30) Foreign Application Priority Data

Nov. 2, 2022　(CN) .......................... 202211364454.8

(51) Int. Cl.
　　*G06F 8/41*　　　(2018.01)
　　*G06F 16/901*　　(2019.01)
(52) U.S. Cl.
　　CPC .......... *G06F 8/427* (2013.01); *G06F 16/9024* (2019.01)
(58) Field of Classification Search
　　CPC ............................ G06F 8/427; G06F 16/9024
　　USPC ........................................................ 717/143
　　See application file for complete search history.

(56) References Cited

U.S. PATENT DOCUMENTS

| | | | | |
|---|---|---|---|---|
| 8,707,252 B1 * | 4/2014 | Alexeev | .................. | G06F 8/427 |
| | | | | 717/136 |
| 9,996,696 B2 * | 6/2018 | Baji-Gál | ............... | G06F 21/577 |
| 12,242,575 B2 * | 3/2025 | Boling | ................ | G06F 9/44521 |
| 2009/0119641 A1 * | 5/2009 | Ramsey | .............. | G06F 16/2448 |
| | | | | 717/114 |
| 2014/0173552 A1 * | 6/2014 | Beale | ........................ | G06F 8/41 |
| | | | | 717/106 |
| 2017/0169068 A1 * | 6/2017 | Kennedy, Jr. | ....... | G06F 16/2433 |
| 2017/0289187 A1 * | 10/2017 | Noel | ........................ | H04L 67/12 |

(Continued)

FOREIGN PATENT DOCUMENTS

| | | |
|---|---|---|
| CN | 104252511 A | 12/2014 |
| CN | 104536987 A | 4/2015 |

(Continued)

OTHER PUBLICATIONS

Ingerman, Peter Zilahy. A syntax-oriented translator. Academic Press, 2014. pp. 31-57. (Year: 2014).*

(Continued)

*Primary Examiner* — Satish Rampuria
(74) *Attorney, Agent, or Firm* — Fish & Richardson P.C.

(57)　　　ABSTRACT

Implementations of this specification provide data processing methods, apparatuses, and systems. In one implementation, a method includes: obtaining a statement for a data operation, wherein the statement comprises a command field, parsing the statement by a compiler, wherein the compiler is configured to support at least one syntax and provide a field translation relation among different syntaxes, in response to determining that the command field is absent from the at least one syntax supported by the compiler, determining a target field in the at least one syntax that corresponds to the command field, and performing the data operation based on the target field.

20 Claims, 4 Drawing Sheets

(56) References Cited

U.S. PATENT DOCUMENTS

| | | | | |
|---|---|---|---|---|
| 2018/0218044 A1* | 8/2018 | Wong | .................. | G06F 16/2282 |
| 2021/0056211 A1* | 2/2021 | Olson | ...................... | G06N 5/01 |

FOREIGN PATENT DOCUMENTS

| | | |
|---|---|---|
| CN | 110245002 A | 9/2019 |
| CN | 113051362 A | 6/2021 |

OTHER PUBLICATIONS

Koppel, James, Varot Premtoon, and Armando Solar-Lezama. "One tool, many languages: language-parametric transformation with incremental parametric syntax." Proceedings of the ACM on Programming Languages 2.OOPSLA (2018): pp. 1-28. (Year: 2018).*
Liu, Xiao, and Dinghao Wu. "From natural language to programming language." Innovative methods, user-friendly tools, coding, and design approaches in people-oriented programming. IGI Global Scientific Publishing, 2018. pp. 110-130. (Year: 2018).*
Bacon, David F., Susan L. Graham, and Oliver J. Sharp. "Compiler transformations for high-performance computing." ACM Computing Surveys (CSUR) 26.4 (1994): pp. 345-420. (Year: 1994).*
Thies, William Frederick. Language and compiler support for stream programs. Diss. Massachusetts Institute of Technology, 2009. pp. 173-184. (Year: 2009).*
Chlipala, Adam. "A verified compiler for an impure functional language." ACM Sigplan Notices 45.1 (2010): pp. 93-106. (Year: 2010).*
neo4j.com [online], "Delete," available on or before Nov. 11, 2019, via Internet Archive: Wayback Machine URL <https://web.archive.org/web/20230000000000*/https://neo4j.com/docs/cypher-manual/current/clauses/delete/>, retrieved on Apr. 22, 2024, URL<https://neo4j.com/docs/cypher-manual/current/clauses/delete/>, 5 pages.
neo4j.com [online], "Set," available on or before Feb. 5, 2019 , via Internet Archive: Wayback Machine URL <https://web.archive.org/web/20230000000000*/https://neo4j.com/docs/cypher-manual/current/clauses/set/>, retrieved on Apr. 22, 2024, URL<https://neo4j.com/docs/cypher-manual/current/clauses/set/>, 12 pages.
runoob.com [online], "MySQL delete sentence," available on or before Jul. 9, 2015, via Internet Archive: Wayback Machine URL <https://web.archive.org/web/20230000000000*/https://www.runoob.com/mysql/mysql-delete-query. html>, retrieved on Apr. 22, 2024, URL<https://www.runoob.com/mysql/mysql-delete-query.html>, 10 pages (with English machine translation).
runoob.com [online], "MySQL Update," available on or before Jul. 9, 2015, via Internet Archive: Wayback Machine URL <https://web.archive.org/web/20230000000000*/https://www.runoob.com/mysql/mysql-update-query.html>, retrieved on Apr. 22, 2024, URL<https://www.runoob.com/mysql/mysql-update-query.html>, 10 pages (with English machine translation).

* cited by examiner

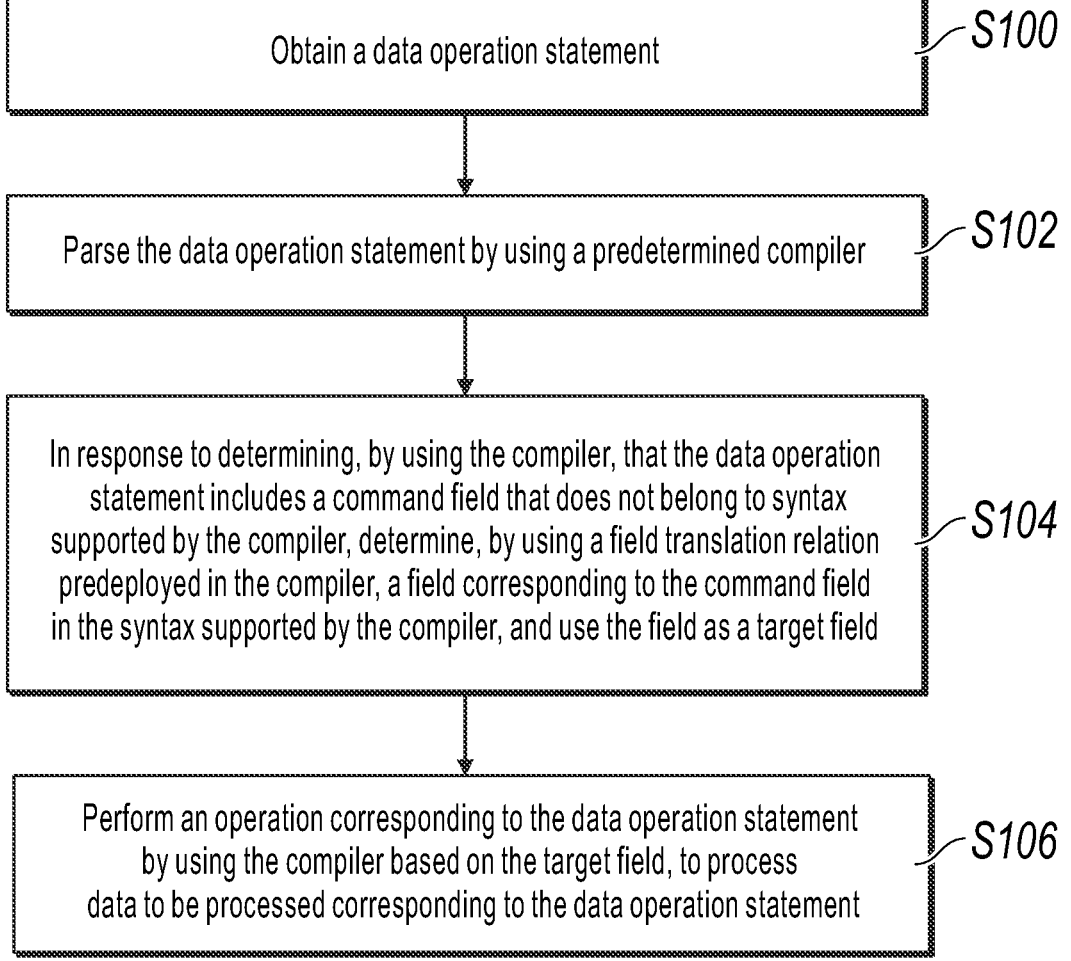

Obtain a data operation statement — S100

Parse the data operation statement by using a predetermined compiler — S102

In response to determining, by using the compiler, that the data operation statement includes a command field that does not belong to syntax supported by the compiler, determine, by using a field translation relation predeployed in the compiler, a field corresponding to the command field in the syntax supported by the compiler, and use the field as a target field — S104

Perform an operation corresponding to the data operation statement by using the compiler based on the target field, to process data to be processed corresponding to the data operation statement — S106

FIG. 1

DATA PROCESSING METHODS AND APPARATUSES, DEVICES, AND STORAGE MEDIUMS

CROSS-REFERENCE TO RELATED APPLICATIONS

This application claims priority to Chinese Patent Application No. 202211364454.8, filed on Nov. 2, 2022, which is hereby incorporated by reference in its entirety.

TECHNICAL FIELD

This specification relates to the field of data processing technologies, and in particular, to data processing methods and apparatuses, devices, and storage mediums.

BACKGROUND

Currently, as a common database, a graph database represents and stores data in the form of nodes, edges, etc. (for example, data are stored by using users as nodes and relations between the users as edges), so that multi-layer association query is efficiently performed.

A structured query language (SQL) is a special programming language, and is usually used to access, query, and update data in a relational database. A syntax structure of the SQL language is very simple, and data in the database can be processed very conveniently by using the SQL language. However, use of the SQL language is not supported in the graph database.

SUMMARY

This specification provides data processing methods and apparatuses, devices, and storage mediums, to partially alleviate the problems in the existing technology.

The following technical solutions are used in this specification.

This specification provides a data processing method, including the following: a data operation statement is obtained; the data operation statement is parsed by using a predetermined compiler; in response to determining, by using the compiler, that the data operation statement includes a command field that does not belong to syntax supported by the compiler, a field corresponding to the command field in the syntax supported by the compiler is determined by using a field translation relation pre-deployed in the compiler, and the field is used as a target field; and an operation corresponding to the data operation statement is performed by using the compiler based on the target field, to process data to be processed corresponding to the data operation statement.

Optionally, that an operation corresponding to the data operation statement is performed by using the compiler based on the target field specifically includes the following: machine code corresponding to the target field is used as machine code corresponding to the command field, and the operation corresponding to the data operation statement is performed based on the machine code corresponding to the target field.

Optionally, that the data operation statement is parsed by using a predetermined compiler specifically includes the following: lexical analysis is performed on the data operation statement by using the compiler, to extract fields included in the data operation statement; and syntax parsing is performed on the data operation statement based on the fields.

Optionally, that syntax parsing is performed on the data operation statement based on the fields specifically includes the following: a syntax parsing rule that matches each field is determined from syntax parsing rules predetermined in the compiler, and the syntax parsing rule is used as a target rule; and a syntax parsing tree for the data operation statement is generated based on the target rule, where each node corresponds to a field in the syntax parsing tree.

Optionally, that an operation corresponding to the data operation statement is performed by using the compiler based on the target field specifically includes the following: an execution sequence of machine code corresponding to the fields included in the data operation statement is determined based on the syntax parsing tree; and machine code corresponding to the target field is used as machine code corresponding to the command field, and the operation corresponding to the data operation statement is performed based on the execution sequence.

Optionally, the syntax supported by the compiler includes Neo4j syntax, and the syntax not supported by the compiler includes structured query language (SQL) syntax.

This specification provides a data processing apparatus, including: an acquisition module, configured to obtain a data operation statement; a parsing module, configured to parse the data operation statement by using a predetermined compiler; a conversion module, configured to: in response to determining, by using the compiler, that the data operation statement includes a command field that does not belong to syntax supported by the compiler, determine, by using a field translation relation pre-deployed in the compiler, a field corresponding to the command field in the syntax supported by the compiler, and use the field as a target field; and an execution module, configured to perform an operation corresponding to the data operation statement by using the compiler based on the target field, to process data to be processed corresponding to the data operation statement.

Optionally, the execution module is specifically configured to use machine code corresponding to the target field as machine code corresponding to the command field, and perform the operation corresponding to the data operation statement based on the machine code corresponding to the target field.

This specification provides a computer-readable storage medium. The storage medium stores a computer program, and when the computer program is executed by a processor, the above-mentioned data processing method is implemented.

This specification provides an electronic device, including a memory, a processor, and a computer program that is stored in the memory and can run on the processor. When the processor executes the program, the above-mentioned data processing method is implemented.

At least one of the above-mentioned technical solutions used in this specification can achieve the following beneficial effects:

According to the data processing methods provided in this specification, the data operation statement is first obtained, and the data operation statement is parsed by using the predetermined compiler. In response to determining that the data operation statement includes the command field that does not belong to the syntax supported by the compiler, the field corresponding to the command field in the syntax supported by the compiler is determined by using the field translation relation pre-deployed in the compiler, and the operation corresponding to the data operation statement is performed by using the compiler based on the target field, to process the data to be processed corresponding to the data operation statement.

It can be seen from the above-mentioned methods that the data operation statement that is input by the user and is written based on specified syntax can be parsed by using the predetermined compiler, and the command field not supported by the compiler can be translated, by using the field translation relation pre-deployed in the compiler, to the corresponding command field in the syntax supported by the compiler, so that the data to be processed can be processed based on the data operation statement input by the user.

BRIEF DESCRIPTION OF DRAWINGS

The accompanying drawings described here are used to provide a further understanding of this specification, and constitute a part of this specification. Example embodiments of this specification and descriptions of the embodiments are used to explain this specification, and do not constitute an inappropriate limitation on this specification. In the accompanying drawings:

FIG. 1 is a schematic flowchart illustrating a data processing method, according to this specification;

DESCRIPTION OF EMBODIMENTS

Figure 2:
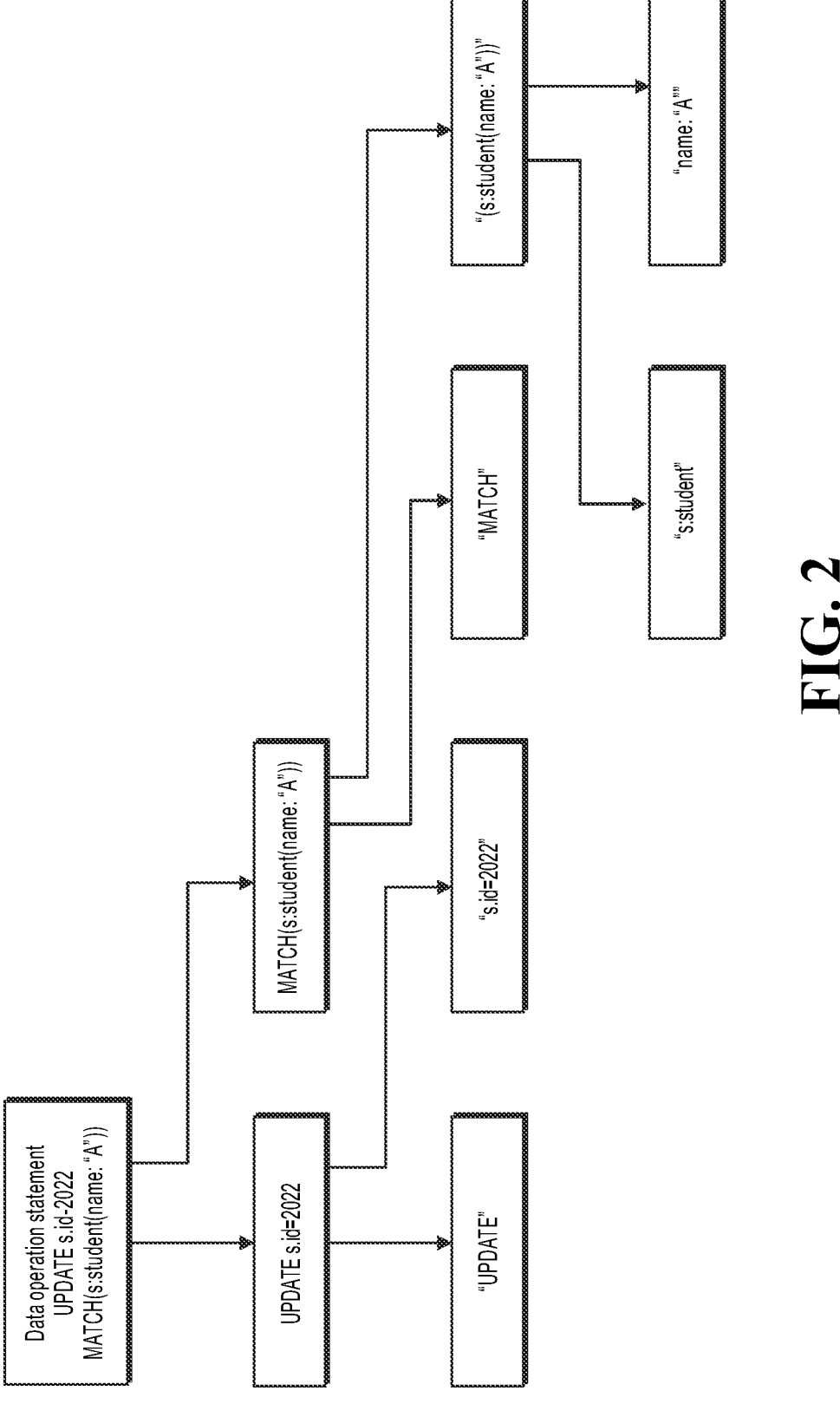
FIG. 2 is a schematic diagram illustrating a syntax parsing method for a data operation statement, according to this specification.

To make the objectives, technical solutions, and advantages of this specification clearer, the following clearly and comprehensively describes the technical solutions of this specification with reference to specific embodiments and accompanying drawings of this specification. Clearly, the described embodiments are merely some rather than all of the embodiments of this specification. All other embodiments obtained by a person of ordinary skill in the art based on the embodiments of this specification without creative efforts shall fall within the protection scope of this specification.

The following describes in detail the technical solutions in the embodiments of this specification with reference to the accompanying drawings.

FIG. 1 is a schematic flowchart illustrating a data processing method, according to this specification. The method includes the following steps:

S100: Obtain a data operation statement.

In this specification, a service platform can process data in a database based on a data operation statement input by a user. The database here can be a graph database. Data processing here includes adding data, deleting data, updating data, querying data, etc.

In the above-mentioned content, the data operation statement input by the user can be a code statement written based on specified syntax. The specified syntax here includes specified syntax for an update code statement, specified syntax for a delete code statement, etc. The following respectively describes in detail writing the specified syntax for the update code statement and the delete code statement based on a specified syntax rule.

If an update statement for updating data in the database needs to be written, an update command field update can be used. Specifically, node data (namely, entity data, for example, one student is an entity, and data such as a name, gender, and age of the student are attribute data of the entity) and/or edge data (namely, relation data, for example, student A and student B are friends, a friend relation is a relation, and a relation number, a relation remark, a relation type, etc. are attribute data of the relation) that need to be updated can be first queried by using a query command field match, and then the queried data can be updated by using the update command field.

For example, assuming that a student number of a student named A needs to be updated to 2, an update statement "UPDATE s.id=2022 MATCH(s:student{name:"A"});" can be written, where "MATCH(s:student{name:"A" }" refers to querying the student named A, and "UPDATE s.id=2022" refers to changing the student number of the student named A to 2022.

For another example, assuming that a remark of a friend relation whose remark is null needs to be updated to "relation with a relatively high intimacy", an update statement "UPDATE f.remark="relation with a relatively high intimacy" MATCH( )-[f:friend_relation{remark=null}]->( );" can be written, where "MATCH( )-[f: friend_relation{remark=null}]->( )" refers to querying a relation whose remark is null in all friend relations of the student named A, and "UPDATE f.remark=relation with a relatively high intimacy" refers to changing a remark of the friend relation of the student named A to "relation with a relatively high intimacy".

For another example, assuming that age of a friend of a student named A needs to be updated to 22, an update statement "UPDATE s2.age=22 MATCH(s1:student{name: "A"})-{f:friend_relation}->(s2);" can be written, where "MATCH(s1:student{name:"A"})-{f:friend_relation}-> (p2)" refers to querying friends of the student named A, and "UPDATE s2.age=22" refers to changing the age of the friend of the student named A to 22.

Similarly, if a delete code statement for deleting data in the database needs to be written, a delete command field delete can be used. Specifically, node data and/or edge data that need to be deleted can be first queried by using the query command field match, and then the queried data can be deleted by using the delete command field.

For example, assuming that data of a student named A need to be deleted, a delete statement "DELETE s MATCH (s:student{name:"A"});" can be written, where "MATCH(s: student{name:"A"})" refers to querying the student named A, and "DELETE s" refers to deleting the data of the student named A.

For another example, assuming that a friend relation whose remark is null needs to be deleted, a delete statement "DELETE f MATCH( )-[f:friend_relation{remark= null}]->( );" can be written, where "MATCH( )-[f: friend_relation{remark=null}]->( )" refers to querying all friend relations whose remarks are null, and "DELETE f" refers to deleting the queried friend relations whose remarks are null.

For another example, assuming that a student who has a friend relation, which has a null remark, with a student named A and the friend relation between the student and the student named A need to be deleted, a delete statement "DELETE f, s2 MATCH(s1:student{name:"A"})-[f: friend_relation{remark=null}]->(s2);" can be written, where "MATCH(s1:student{name:"A"})-[f: friend_relation{remark=null}]->(s2);" students who have friend relations, which have a null remark, with the student named A, and "DELETE f, s2" refers to deleting the students who have friend relations, which have a null remark, with the student named A and the friend relations between the students and the student named A.

Further, if query results need to be sorted, and sorted query results need to be updated or deleted, data that need to be sorted can be first queried by using a match command field, and then the query results can be sorted by using an order by command field. Further, at least a part of data can be selected from the sorted query results by using a limit command field, and further, at least a part of data in the sorted query results can be updated or deleted by using an update or delete command field.

For example, assuming that scores of friends with top ten scores in friends of a student named A need to be updated to 100, an update statement "UPDATE s2.score=100 MATCH (s:student{name:"A"})-[f:friend_relation]->(s2) order by s2.score desc limit 10;" can be written, where "MATCH(s: student{name:"A"})-[f:friend_relation]->(s2)" refers to querying friends of the student named A, "order by s2.score desc" refers to sorting the friends of the student named A in descending order based on scores (the desc command field here indicates performing sorting in descending order, and correspondingly, the command field asc is used to sort the query results in ascending order), "limit 10" refers to intercepting top ten query results in sorted query results, and "UPDATE s2.score=100" refers to changing scores of the obtained friends with top ten scores in the friends of the student named A to 100.

For another example, assuming that friends with top ten scores in friends of a student named A and edges used to represent friend relations between these friends and the student named A need to be deleted, a delete statement "DELETE f, s2 MATCH(s:student{name:"A"})-[f:friend_relation]->(s2) order by s2.score desc limit 10;" can be written, where "MATCH(s:student{name:"A"})-[f:friend_relation]->(s2)" refers to querying the friends of the student named A, "order by s2.score desc" refers to sorting the friends of the student named A in descending order based on scores, "limit 10" refers to intercepting top ten query results in sorted query results, and "DELETE f, s2" refers to deleting the friends with top ten scores in the friends of the student named A and deleting the edges used to represent the friend relations between these friends and the student named A.

It can be seen from the above-mentioned content that the user can sort queried data based on command fields included in specified syntax, and perform an operation on sorted data.

In this specification, an execution body of the data processing method can be a specified device, for example, a server, disposed on a service platform, or can be a terminal device, for example, a desktop computer or a notebook computer. For ease of description, the following uses only an example that the server is the execution body to describe the data processing method provided in the specification.

S102: Parse the data operation statement by using a predetermined compiler.

After obtaining the data operation statement input by the user, the server can parse the data operation statement by using the predetermined compiler.

Specifically, the server can perform lexical analysis on the data operation statement by using the compiler, to extract fields included in the data operation statement. Lexical analysis can be splitting the fields in the data operation statement based on specified separators, and the specified separators here can be spaces, etc.

For example, if the data operation statement is "UPDATE s.id=2022 MATCH(s:student{name:"A"})", the data operation statement can be split into fields such as "UPDATE", "s.id=2022", "MATCH", "s:student", and "name:A".

Further, the server can perform syntax analysis on the data operation statement based on the fields that correspond to the data operation statement and are obtained through lexical analysis.

Specifically, the server can perform syntax analysis on the data operation statement based on a predetermined syntax parsing rule, to obtain a syntax parsing tree, which is specifically shown in FIG. 2.

FIG. 2 is a schematic diagram illustrating a syntax parsing method for a data operation statement, according to this specification.

It can be seen from FIG. 2 and the above-mentioned content that fields corresponding to a data operation statement "UPDATE s.id=2022 MATCH(s:student{name: "A"});" are "UPDATE", "s.id=2022", "MATCH", "s:student", and "name:A". Further, a syntax parsing rule that matches each field can be determined from syntax parsing rules predetermined in the compiler and used as a target rule, and a syntax parsing tree for the data operation statement can be generated based on the target rule. Each node corresponds to a field in the syntax parsing tree.

Further, the data operation statement input by the user can be split into two nodes "UPDATE s.id=2022" and "MATCH (s:student{name:"A"})" by using the predetermined syntax parsing rule. The first node can be split into two leaf nodes "UPDATE" and "s.id=2022". Similarly, the second node can be split into "MATCH" and "(s:student{name:"A"})", where "(s:student{name:"A"})" can be further split into two leaf nodes:"s:student{ }" and "name:"A"".

The above-mentioned syntax parsing rule (namely, grammar) is a form rule used to describe construction of a syntax composition structure. The server can parse a data operation statement into a syntax parsing tree by using the syntax parsing rule. A specific parsing method can be LL(1) grammar, etc. The following uses an example to describe in detail how the server parses the statement based on the predetermined syntax parsing rule.

For example, assume that two syntax parsing rules are "N->ND|D" and "D->0|1". The first syntax parsing rule in the two rules means that character "N" can be parsed into ND or D. The second syntax parsing rule means that character D can be parsed into 0 or 1. Any binary statement can be parsed by using the two syntax parsing rules. N and D are non-terminal symbols, namely, characters that can be further parsed based on actual needs. 0 and 1 are terminal symbols, in other words, 0 and 1 cannot be further parsed. The following uses a statement "1011" as an example to describe in detail the process of parsing the statement "1011" by using the syntax parsing rule.

The statement "1011" can be parsed starting from a start character N of syntax parsing (in other words, N is used as a root node of a tree). It can be seen from the first syntax parsing rule that the root node N can have two parsing results of being parsed into ND and being parsed into D. It can be seen from the above-mentioned two syntax parsing rules that if N is parsed into D, D can be parsed only into 0 or 1 based on the second syntax parsing rule, and 0 or 1 cannot be further parsed because 0 or 1 is a terminal symbol. It can be seen from the statement "1011" that when N is directly parsed into D, only "0" or "1" can be obtained, but the statement "1011" cannot be parsed out. Therefore, the first syntax parsing rule can be determined as the target rule, to parse the root node based on the first parsing result, in other words, parse root node N into two first-layer branch nodes N and D of the tree.

For the two first-layer branch nodes N and D, it can be seen from the two syntax parsing rules that for first-layer branch node N, the first syntax parsing rule can continue to be used as the target rule, to parse first-layer branch node N into two second-layer branch nodes N and D of the tree. For first-layer branch node D, the second syntax parsing rule can be used as the target rule, to parse first-layer branch node D into two second-layer branch nodes 0 and 1, and a parsing process of first-layer branch node D ends here.

For second-layer branch node N, the first syntax parsing rule can be used as the target rule, to parse second-layer branch node N into two third-layer branch nodes N and D of the tree. For second-layer branch node D, the second syntax parsing rule can be used as the target rule, to parse second-layer branch node D into two third-layer branch nodes 0 and 1, and a parsing process of second-layer branch node D ends here.

For third-layer branch node N, the first syntax parsing rule can be used as the target rule, to parse third-layer branch node N into two fourth-layer branch nodes N and D of the tree. For third-layer branch node D, the second syntax parsing rule can be used as the target rule, to parse third-layer branch node D into two fourth-layer branch nodes 0 and 1, and a parsing process of third-layer branch node D ends here.

For fourth-layer branch node N, the second syntax parsing rule can be used as the target rule, to parse fourth-layer branch node N into fifth-layer branch node D. For fourth-layer branch node D and fifth-layer branch node D, the second syntax parsing rule can be used as the target rule, to parse fourth-layer branch node D and fifth-layer branch node D into 0 and 1. Further, the statement "1011" can be derived based on a corresponding terminal symbol 0 or 1 at each layer. The syntax parsing tree can be obtained based on the above-mentioned parsing process.

S104: In response to determining, by using the compiler, that the data operation statement includes a command field that does not belong to syntax supported by the compiler, determine, by using a field translation relation pre-deployed in the compiler, a field corresponding to the command field in the syntax supported by the compiler, and use the field as a target field.

S106: Perform an operation corresponding to the data operation statement by using the compiler based on the target field, to process data to be processed corresponding to the data operation statement.

Further, when determining, by using the predetermined compiler, that the data operation statement includes a field that does not belong to the syntax supported by the compiler, the service area determines, by using the field translation relation pre-deployed in the compiler, the field corresponding to the command field in the syntax supported by the compiler, uses the field as the target field, and performs the operation corresponding to the data operation statement by using the compiler based on the target field, to process the data to be processed corresponding to the data operation statement. The syntax supported by the compiler here can be Neo4j syntax.

Specifically, after determining the syntax parsing tree corresponding to the data operation statement input by the user, the server can determine an execution sequence of machine code corresponding to the fields included in the data operation statement, use machine code corresponding to the target field as machine code corresponding to the command field, and perform the operation corresponding to the data operation statement based on the execution sequence.

For example, for a command field update in specified syntax, after determining that the command field is a field that does not belong to the syntax supported by the compiler, the compiler can determine a field set as a field corresponding to update by using the field translation relation pre-deployed in the compiler, so that when the data operation statement is compiled into machine code, machine code corresponding to set can be used as machine code corresponding to update.

It can be seen from the above-mentioned content that lexical analysis and syntax analysis can be performed on the data operation statement that is input by the user, is written based on specified syntax, and is used to process data in a graph database, and the syntax parsing tree can be generated based on an analysis result. Therefore, when the data operation statement input by the user is executed by using the compiler based on the generated syntax parsing tree, a command field that is included in the data operation statement, belongs to the specified syntax, and is not supported by the complier can be translated into a field in the syntax supported by the compiler, so as to process data to be processed stored in the graph database.

The data processing methods provided in one or more embodiments of this specification are described above. Based on the same idea, this specification further provides corresponding data processing apparatuses, as shown in FIG. 3.

Figure 3:
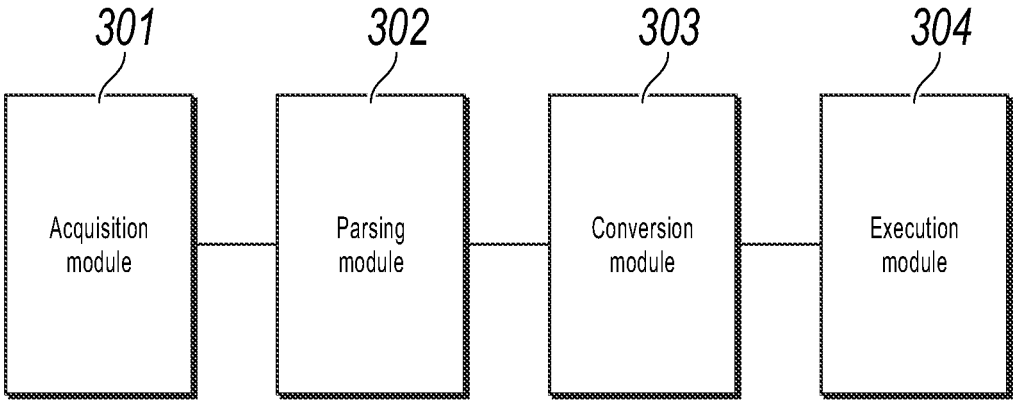
FIG. 3 is a schematic diagram illustrating a data processing apparatus, according to this specification.

FIG. 3 is a schematic diagram illustrating a data processing apparatus, according to this specification. The apparatus includes: an acquisition module 301, configured to obtain a data operation statement; a parsing module 302, configured to parse the data operation statement by using a predetermined compiler; a conversion module 303, configured to: in response to determining, by using the compiler, that the data operation statement includes a command field that does not belong to syntax supported by the compiler, determine, by using a field translation relation pre-deployed in the compiler, a field corresponding to the command field in the syntax supported by the compiler, and use the field as a target field; and an execution module 304, configured to perform an operation corresponding to the data operation statement by using the compiler based on the target field, to process data to be processed corresponding to the data operation statement.

Optionally, the execution module 304 is specifically configured to use machine code corresponding to the target field as machine code corresponding to the command field, and perform the operation corresponding to the data operation statement based on the machine code corresponding to the target field.

Optionally, the parsing module 302 is specifically configured to perform lexical analysis on the data operation statement by using the compiler, to extract fields included in the data operation statement, and parse the data operation statement based on the fields.

Optionally, the parsing module 302 is specifically configured to determine, from syntax parsing rules predetermined in the compiler, a syntax parsing rule that matches each field, and use the syntax parsing rule as a target rule; and generate a syntax parsing tree for the data operation statement based on the target rule, where each node corresponds to a field in the syntax parsing tree.

Optionally, the parsing module 302 is specifically configured to determine, based on the syntax parsing tree, an execution sequence of machine code corresponding to the fields included in the data operation statement, use machine code corresponding to the target field as machine code corresponding to the command field, and perform the operation corresponding to the data operation statement based on the execution sequence.

Optionally, the syntax supported by the compiler includes Neo4j syntax, and the syntax not supported by the compiler includes structured query language (SQL) syntax.

This specification further provides a computer-readable storage medium. The storage medium stores a computer program, and the computer program can be configured to perform the above-mentioned data processing method provided in FIG. 1.

Figure 4:
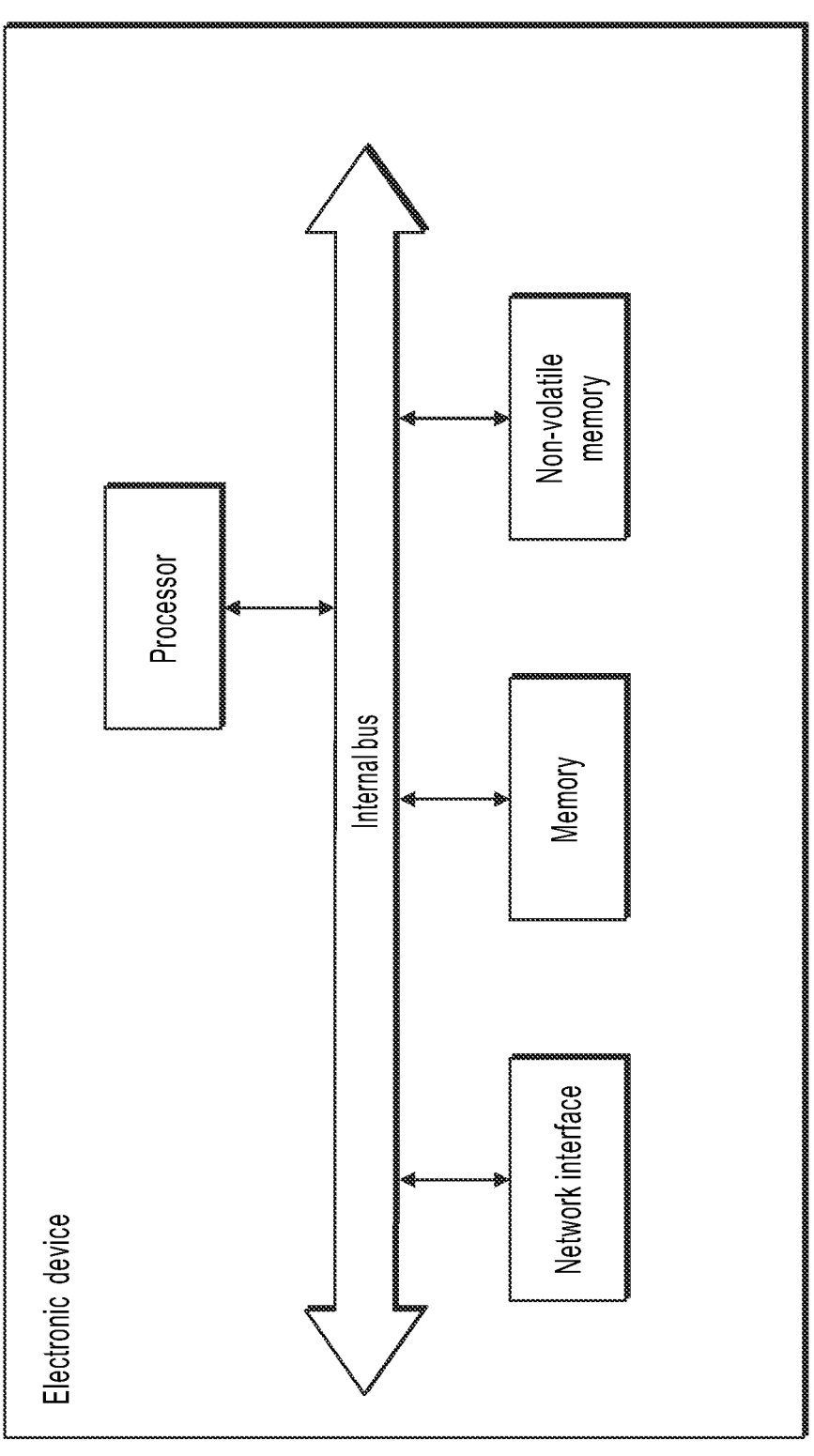
FIG. 4 is a schematic diagram illustrating an electronic device corresponding to FIG. 1, according to this specification.

This specification further provides a schematic diagram illustrating a structure of an electronic device, shown in FIG. 4, corresponding to FIG. 1. As shown in FIG. 4, in terms of hardware, the electronic device includes a processor, an internal bus, a network interface, a memory, and a non-volatile memory, and certainly can further include hardware needed by another service. The processor reads a corresponding computer program from the non-volatile memory into the memory and runs the computer program, to implement the above-mentioned data processing method in FIG. 1. Certainly, in addition to software implementations, this specification does not exclude other implementations, for example, a logic device or a combination of hardware and software. In other words, an execution body of the following processing procedure is not limited to logical units, and can be hardware or a logic device.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, this type of programming is mostly implemented by using "logic compiler" software. The programming is similar to a software compiler used to develop and write a program. Original code needs to be written into a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer-readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the above-mentioned embodiments can be implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or any combination of these devices. For ease of description, the apparatus above is described by dividing functions into various units. Certainly, when this specification is implemented, functions of the units can be implemented in one or more pieces of software and/or hardware.

A person skilled in the art should understand that embodiments of this specification can be provided as methods, systems, or computer program products. Therefore, this specification can use a form of hardware only embodiments, software only embodiments, or embodiments with a combination of software and hardware. Moreover, this specification can use a form of a computer program product that is implemented on one or more computer-usable storage media (including but not limited to a disk memory, a compact disc read-only memory (CD-ROM), an optical memory, etc.) that include computer-usable program code.

This specification is described with reference to the flowcharts and/or block diagrams of the method, the device (system), and the computer program product based on the embodiments of this specification. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a special-purpose computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions can be stored in a computer-readable memory that can instruct the computer or the another programmable data processing device to work in a specific way, so the instructions stored in the computer-readable memory generate an artifact that includes an instruction apparatus. The instruction apparatus implements a specific function in one or more processes in the flowcharts and/or in one or more blocks in the block diagrams.

These computer program instructions can be loaded onto the computer or the another programmable data processing device, so that a series of operation steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more central processing units (CPU), input/output interfaces, network interfaces, and memories.

The memory may include a non-persistent memory, a random access memory (RAM), a non-volatile memory, and/or another form in a computer-readable medium, for example, a read-only memory (ROM) or a flash memory (flash RAM). The memory is an example of the computer-readable medium.

The computer-readable medium includes permanent and non-permanent, removable and non-removable media, and can store information by using any method or technology. The information can be a computer-readable instruction, a data structure, a program module, or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EE-PROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computing device. Based on the definition in this specification, the computer-readable medium does not include a transitory computer-readable medium, for example, a modulated data signal and carrier.

It is worthwhile to further note that the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that embodiments of this specification can be provided as methods, systems, or computer program products. Therefore, this specification can use a form of hardware only embodiments, software only embodiments, or embodiments with a combination of software and hardware. Moreover, this specification can use a form of a computer program product that is implemented on one or more computer-usable storage media (including but not limited to a disk memory, a compact disc read-only memory (CD-ROM), an optical memory, etc.) that include computer-usable program code.

This specification can be described in the general context of computer-executable instructions executed by a computer, for example, a program module. Generally, the program module includes a routine, a program, an object, a component, a data structure, etc. executing a specific task or implements a specific abstract data type. This specification can also be practiced in distributed computing environments. In the distributed computing environments, tasks are performed by remote processing devices that are connected through a communications network. In the distributed computing environments, the program module can be located in both local and remote computer storage media including storage devices.

Embodiments of this specification are described in a progressive way. For same or similar parts of the embodiments, mutual references can be made to the embodiments. Each embodiment focuses on a difference from other embodiments. Particularly, system embodiments are briefly described since they are basically similar to method embodiments. For related parts, references can be made to related descriptions in the method embodiments.

The above-mentioned descriptions are merely embodiments of this specification and are not intended to limit this specification. A person skilled in the art can make various changes and variations to this specification. Any modification, equivalent replacement, or improvement made without departing from the spirit and principle of this specification shall fall within the scope of the claims in this specification.

The invention claimed is:

1. A computer-implemented method for processing data in a graph database, the method comprising:

obtaining a statement for a data operation, wherein the statement comprises a command field;

performing syntax parsing on the statement by a compiler based on a plurality of fields comprised in the statement, wherein the compiler supports at least one syntax, provides a field translation relation among different syntaxes, performs lexical analysis on the statement to extract the plurality of fields comprised in the statement, and performs syntax parsing on the statement based on the plurality of fields by selecting a target rule from multiple preset rules for syntax parsing and generating a syntax parsing tree for the statement based on the target rule;

in response to determining that the command field is absent from the at least one syntax supported by the compiler, determining a target field in the at least one syntax that corresponds to the command field; and performing the data operation based on the target field.

2. The computer-implemented method according to claim 1, wherein performing the data operation based on the target field comprises:

using a machine code corresponding to the target field as a machine code corresponding to the command field; and performing the data operation based on the machine code corresponding to the target field.

3. The computer-implemented method according to claim 1, comprising:

performing lexical analysis on the statement to extract the plurality of fields comprised in the statement.

4. The computer-implemented method according to claim 3, wherein performing syntax parsing on the statement based on the plurality of fields comprises:

selecting a target rule from multiple rules for syntax parsing, wherein the multiple rules are preset in the compiler, and wherein the target rule matches each of the plurality of fields; and generating a syntax parsing tree for the statement based on the target rule, wherein each node of the syntax parsing tree corresponds to one of the plurality of fields.

5. The computer-implemented method according to claim 4, wherein performing the data operation based on the target field comprises:

determining, based on the syntax parsing tree, an execution sequence of machine codes corresponding to the plurality of fields comprised in the statement; and performing the data operation based on the execution sequence.

6. The computer-implemented method according to claim 1, wherein the at least one syntax supported by the compiler comprises Neo4j syntax.

7. The computer-implemented method according to claim 1, wherein structured query language (SQL) syntax is unsupported by the compiler.

8. A non-transitory, computer-readable medium storing one or more instructions executable by a computer system to perform operations comprising:

obtaining a statement for a data operation, wherein the statement comprises a command field;

performing syntax parsing on the statement by a compiler based on a plurality of fields comprised in the statement, wherein the compiler supports at least one syntax, provides a field translation relation among different syntaxes, performs lexical analysis on the statement to extract the plurality of fields comprised in the statement, and performs syntax parsing on the statement based on the plurality of fields by selecting a target rule from multiple preset rules for syntax parsing and generating a syntax parsing tree for the statement based on the target rule;

in response to determining that the command field is absent from the at least one syntax supported by the compiler, determining a target field in the at least one syntax that corresponds to the command field; and performing the data operation based on the target field.

9. The non-transitory, computer-readable medium of claim 8, wherein performing the data operation based on the target field comprises:

using a machine code corresponding to the target field as a machine code corresponding to the command field; and performing the data operation based on the machine code corresponding to the target field.

10. The non-transitory, computer-readable medium of claim 8, wherein the operations comprise:

performing lexical analysis on the statement to extract the plurality of fields comprised in the statement.

11. The non-transitory, computer-readable medium of claim 10, wherein performing syntax parsing on the statement based on the plurality of fields comprises:

selecting a target rule from multiple rules for syntax parsing, wherein the target rule matches each of the plurality of fields, and wherein the syntax parsing is preset in the compiler; and generating a syntax parsing tree for the statement based on the target rule, wherein each node of the syntax parsing tree corresponds to one of the plurality of fields.

12. The non-transitory, computer-readable medium of claim 11, wherein performing the data operation based on the target field comprises:

determining, based on the syntax parsing tree, an execution sequence of machine codes corresponding to the plurality of fields comprised in the statement; and performing the data operation based on the execution sequence.

13. The non-transitory, computer-readable medium of claim 8, wherein the at least one syntax supported by the compiler comprises Neo4j syntax.

14. The non-transitory, computer-readable medium of claim 8, wherein structured query language (SQL) syntax is unsupported by the compiler.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

obtaining a statement for a data operation, wherein the statement comprises a command field;

performing syntax parsing on the statement by a compiler based on a plurality of fields comprised in the statement, wherein the compiler supports at least one syntax, provides a field translation relation among different syntaxes, performs lexical analysis on the statement to extract the plurality of fields comprised in the statement, and performs syntax parsing on the statement based on the plurality of fields by selecting a target rule from multiple preset rules for syntax parsing and generating a syntax parsing tree for the statement based on the target rule;

in response to determining that the command field is absent from the at least one syntax supported by the compiler, determining a target field in the at least one syntax that corresponds to the command field; and performing the data operation based on the target field.

16. The computer-implemented system of claim 15, wherein performing the data operation based on the target field comprises:

using a machine code corresponding to the target field as a machine code corresponding to the command field; and performing the data operation based on the machine code corresponding to the target field.

17. The computer-implemented system of claim 15, wherein the operations comprise:

performing lexical analysis on the statement to extract the plurality of fields comprised in the statement.

18. The computer-implemented system of claim 17, wherein performing syntax parsing on the statement based on the plurality of fields comprises:

selecting a target rule from multiple rules for syntax parsing, wherein the target rule matches each of the plurality of fields, and wherein the syntax parsing is preset in the compiler; and generating a syntax parsing tree for the statement based on the target rule, wherein each node of the syntax parsing tree corresponds to one of the plurality of fields.

19. The computer-implemented system of claim 18, wherein performing the data operation based on the target field comprises:

determining, based on the syntax parsing tree, an execution sequence of machine codes corresponding to the plurality of fields comprised in the statement; and performing the data operation based on the execution sequence.

20. The computer-implemented system of claim 15, wherein the at least one syntax supported by the compiler comprises Neo4j syntax, and wherein structured query language (SQL) syntax is unsupported by the compiler.

* * * * *